US008239822B2

(12) United States Patent
Guenter

(10) Patent No.: US 8,239,822 B2
(45) Date of Patent: Aug. 7, 2012

(54) SYMBOLIC FORWARD AND REVERSE DIFFERENTIATION

(75) Inventor: Brian Kevin Guenter, Redmond, WA (US)

(73) Assignee: Microsoft Corp., Redmond, WA (US)

( * ) Notice: Subject to any disclaimer, the term of this patent is extended or adjusted under 35 U.S.C. 154(b) by 1146 days.

(21) Appl. No.: 12/105,277

(22) Filed: Apr. 18, 2008

(65) Prior Publication Data

US 2009/0265685 A1    Oct. 22, 2009

(51) Int. Cl.
*G06F 9/44*    (2006.01)
(52) U.S. Cl. .......................................... 717/106
(58) Field of Classification Search .................. 717/106; 708/443
See application file for complete search history.

(56) References Cited

U.S. PATENT DOCUMENTS

| | | | |
|---|---|---|---|
| 6,202,203 B1* | 3/2001 | Ng | 717/151 |
| 6,397,380 B1 | 5/2002 | Bittner et al. | |
| 6,483,514 B1 | 11/2002 | Duff | |
| 6,895,574 B2 | 5/2005 | Walster | |
| 6,990,230 B2* | 1/2006 | Piponi | 382/154 |
| 7,117,186 B2* | 10/2006 | Koza et al. | 706/13 |
| 7,346,901 B2* | 3/2008 | Syme et al. | 717/148 |
| 7,500,228 B2* | 3/2009 | Holmes et al. | 717/136 |
| 7,752,588 B2* | 7/2010 | Bose | 716/122 |
| 7,814,451 B2* | 10/2010 | Furnish et al. | 716/100 |
| 7,921,392 B2* | 4/2011 | Furnish et al. | 716/110 |
| 2003/0105614 A1 | 6/2003 | Langemyr et al. | |
| 2004/0030414 A1* | 2/2004 | Koza et al. | 700/1 |
| 2004/0133885 A1 | 7/2004 | Giering et al. | |
| 2004/0146197 A1* | 7/2004 | Piponi | 382/154 |
| 2004/0236806 A1 | 11/2004 | Turner | |
| 2005/0015755 A1* | 1/2005 | Holmes et al. | 717/136 |
| 2008/0216039 A1* | 9/2008 | Furnish et al. | 716/9 |
| 2009/0182735 A1* | 7/2009 | Cohen et al. | 707/5 |
| 2009/0217248 A1* | 8/2009 | Bently et al. | 717/132 |

OTHER PUBLICATIONS

Guenter, "Efficient Symbolic Differentiation for Graphics Applications", ACM Transactions on Graphics (TOG), vol. 26 , Issue 3 (Jul. 2007), Proceedings of the 2007 SIGGRAPH conference, Session: Character animation II, Article No. 108, Year of Publication: 2007, 13 Pages.
Bischof, et al., "On the Implementation of Automatic Differentiation Tools", Preprint of the Institute for Scientific Computing RWTH-CS-SC-02-05, Aachen University of Technology, Aachen, 2002, pp. 1-26.
Bartlett, et al., "Automatic Differentiation of C++ Codes for Large-Scale Scientific Computing", International Conference on Computational Science (4) 2006, pp. 525-532.
"The Process of Automatic Differentiation", http://sepwww.stanford.edu/public/docs/sep73/martin1/paper_html/node2.html.
Campbell, et al., "Automatic Differentiation and Implicit Differential Equations", Proc. Second International Workshop on Computational Differentiation, SIAM, 1996, pp. 1-14.

\* cited by examiner

*Primary Examiner* — John E Breene
*Assistant Examiner* — Hua Lu
(74) *Attorney, Agent, or Firm* — Lyon & Harr, LLP; Katrina A. Lyon

(57) ABSTRACT

The symbolic differentiation technique described herein uses operator overloading and two simple recursive procedures, both the forward and reverse forms of differentiation, to create purely symbolic derivatives. The symbolic derivative expressions can be translated into a program in an arbitrary source language, such as C# or C++, and this program can then be compiled to generate an efficient executable which eliminates much of the interpretive overhead normally encountered in automatic differentiation.

20 Claims, 7 Drawing Sheets

GRAPH G(V,E) where the set of vertices or nodes is V={a, b, c, d, e} and the set of edges or links is E={ (a,b), (b,c), (b,d), (b,e)}

SYMBOLIC FORWARD AND REVERSE DIFFERENTIATION

BACKGROUND

Functions with densely interconnected expression graphs, which arise in computer graphics applications such as flight dynamics, space-time optimization, and robotics can be difficult to efficiently differentiate using existing symbolic or automatic differentiation techniques. Derivatives are essential in many computer graphics applications, such as, for example, optimization applied to global illumination and dynamics problems, computing surface normals and curvature, and so on. Derivatives can be computed manually or by a variety of automatic techniques, such as finite differencing, automatic differentiation, or symbolic differentiation. Manual differentiation is tedious and error-prone and therefore automatic techniques are desirable for all but the simplest functions. However, functions whose expression graphs are densely interconnected, such as recursively defined functions or functions that involve sequences of matrix transformations, are difficult to efficiently differentiate using existing techniques.

Automatic differentiation and symbolic differentiation have historically been viewed as completely different methods for computing derivatives. Automatic differentiation is generally considered to be strictly a numerical technique. Both forward and reverse automatic differentiation are non-symbolic techniques independently developed by several groups in the 60s and 70s respectively. In the forward method derivatives and function values are computed together in a forward sweep through the expression graph. In the reverse method function values and partial derivatives at each node are computed in a forward sweep and then the final derivative is computed in a reverse sweep. Users generally must choose which of the two techniques to use on the entire expression graph, or whether to apply forward to some sub-graphs and reverse to others. Forward and reverse are the most widely used of all automatic differentiation algorithms. The forward method is efficient for $\mathbb{R}^1 \to \mathbb{R}^n$ functions (where $\mathbb{R}$ is the set of real numbers) but may do n times as much work as necessary for $\mathbb{R}^n \to \mathbb{R}^1$ functions. Conversely, the reverse method is efficient for $f: \mathbb{R}^n \to \mathbb{R}^1$ may do n times as much work as necessary for $f: \mathbb{R}^1 \to \mathbb{R}^n$ For $f: \mathbb{R}^1 \to \mathbb{R}^n$ both methods may do more work than necessary. In automatic differentiation numerical values of the derivative are computed for each function mode and numerical values are added and multiplied in order to compute the compete numerical values of the derivative. There is never a symbolic representation of the derivative function Symbolic differentiation has traditionally been the domain of expensive, proprietary symbolic math systems. These systems work well for simple expressions but computation time and space grow rapidly, often exponentially, as a function of expression size, in practice frequently exceeding available memory or acceptable computation time.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The symbolic differentiation technique described herein uses operator overloading and symbolic forms of forward and reverse differentiation to create purely symbolic derivatives. In this symbolic differentiation technique a new derivative graph equal to the derivative of the original function is created.

More specifically, in one embodiment of the symbolic differentiation technique, an expression to be differentiated is input. The expression is converted to a directed acyclic graph of node objects and edges where each node represents one operation or sub-expression of the expression. The directed acyclic graph is converted to a new derivative graph where each edge corresponds to a partial derivative of the parent node which is a sub-expression of the original expression. Nodes of the new derivative graph can be added to obtain the total derivative of the expression. For each child edge for each parent node, the partial derivative of the sub-expression is computed. The total derivative of the input expression is then computed by summing the partial derivatives of each child edge for the parent nodes. The computed total derivative of the expression can then be employed in an application that requires computation of the derivative for the expression.

Another exemplary process employing the symbolic differentiation technique is as follows. An expression to be differentiated is input. The expression is converted to a directed acyclic graph of node objects and edges where each node represents one operation or sub-expression of the expression. The directed acyclic graph is then converted to a new derivative graph where each edge of the derivative graph corresponds to a partial derivative of the parent node (e.g., sub-expression of the original expression). Nodes of the new derivative graph can be added to obtain the total derivative of the expression. In one embodiment, starting at the root of the derivative graph and working up the graph, for each sub-expression a check is made to see if the derivative of the sub-expression is in a hash table that contains the derivatives of common sub-expressions. If the derivative of the sub-expression is not in the hash table, the derivative of the sub-expression is computed and put into the hash table. If the derivative of the sub-expression is in the hash table, this value is used for the sub-expression. The total derivative of the originally input expression is then computed by summing the derivatives of each child edge or sub-expression. The computed total derivative of the expression is then used in an application that requires computation of the derivative for the expression.

In the following description of embodiments of the disclosure, reference is made to the accompanying drawings which form a part hereof, and in which are shown, by way of illustration, specific embodiments in which the technique may be practiced. It is understood that other embodiments may be utilized and structural changes may be made without departing from the scope of the disclosure.

DESCRIPTION OF THE DRAWINGS

The specific features, aspects, and advantages of the disclosure will become better understood with regard to the following description, appended claims, and accompanying drawings where:

DETAILED DESCRIPTION

In the following description of the symbolic differentiation technique, reference is made to the accompanying drawings, which form a part thereof, and which is shown by way of illustration examples by which the symbolic differentiation technique described herein may be practiced. It is to be understood that other embodiments may be utilized and structural changes may be made without departing from the scope of the claimed subject matter.

1.0 Symbolic Differentiation Technique

The symbolic differentiation technique described herein uses operator overloading (the ability to tell the compiler how to perform a certain operation when its corresponding operator is used on one or more variables) and two simple recursive procedures, both the forward and reverse forms of differentiation, to create purely symbolic derivatives. If desired, the symbolic derivative expressions can be translated into a program in an arbitrary source language, such as C# or C++, and this program can then be compiled to generate an efficient executable which eliminates much of the interpretive overhead normally encountered in automatic differentiation.

1.1 Exemplary Environment for Employing the Symbolic Differentiation Technique

Figure 1:
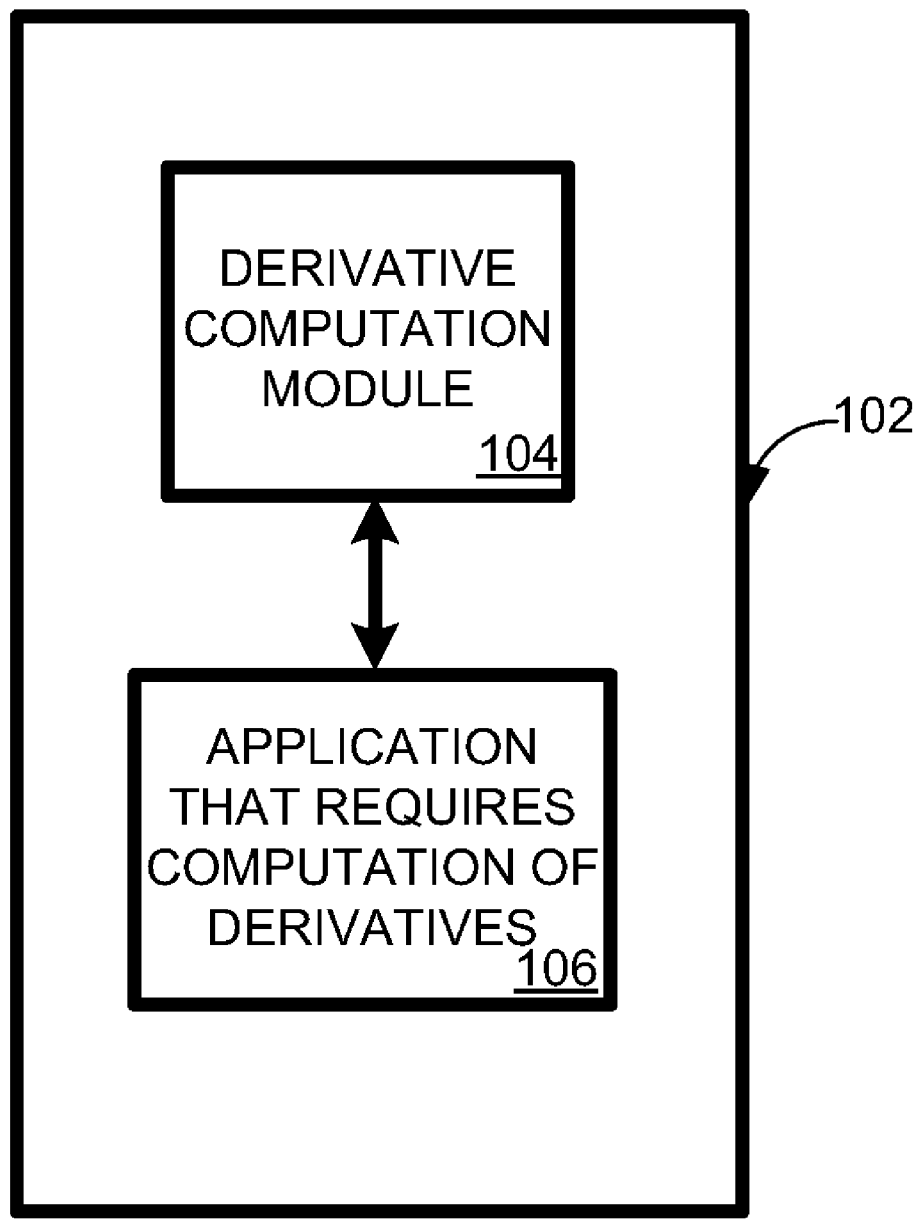
FIG. 1 provides an overview of one possible environment in which the symbolic differentiation technique described herein can be employed.

FIG. 1 provides an exemplary environment in which the symbolic automatic differentiation technique can be practiced. The computation of derivatives is required for many different applications, such as for example, flight dynamics, space-time optimization, robotics, rocket science, and so on. For example, the technique is particularly valuable in computing the optimization of smooth continuous functions where technique is used to an objective function to be minimized or maximized. Other applications include computing derivatives for performing sensitivity analysis (e.g., determining which input variables to a function have the greatest effect on the output). The technique can also be used in computing derivatives when performing error analysis, computing bounds on an error in computing some function given that there are errors of known sizes in the inputs. Additionally, the technique can be used to compute derivatives when computing Taylor series expansions of arbitrary functions which can be used to solve ordinary and partial differential equations. In employing one embodiment of the symbolic automatic differentiation technique a differentiation computation module 104 resides on a computing device 102. This derivative computation module 104 computes a derivative of a given expression such as is submitted to it by an application that requires computation of derivatives 106. The application 106 can then perform its intended functions by employing the computed derivatives.

1.2 Exemplary Architecture Employing the Symbolic Differentiation Technique

Figure 2:
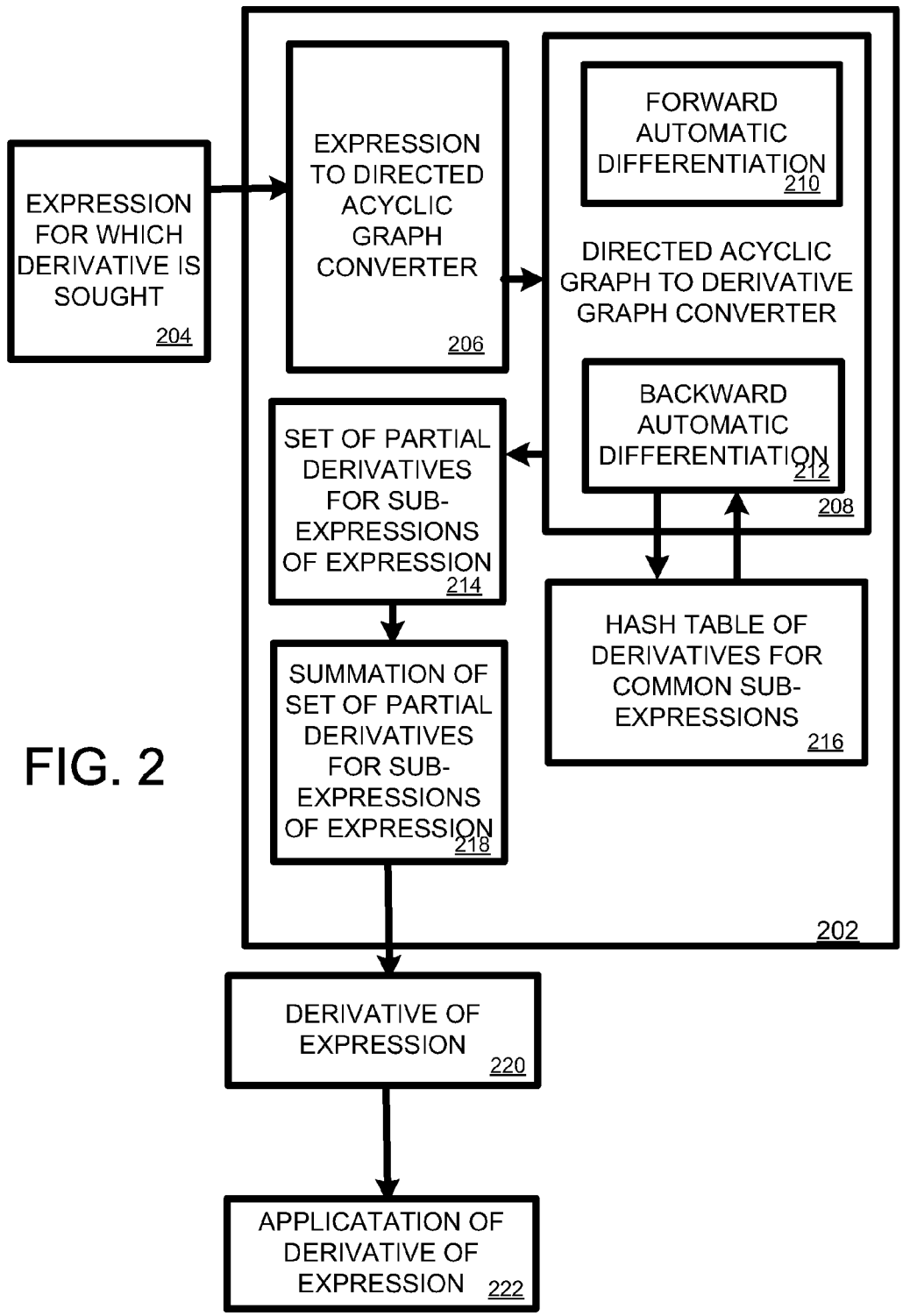
FIG. 2 is a diagram depicting one exemplary architecture in which one embodiment of the symbolic differentiation technique can be employed.
Figure 5:
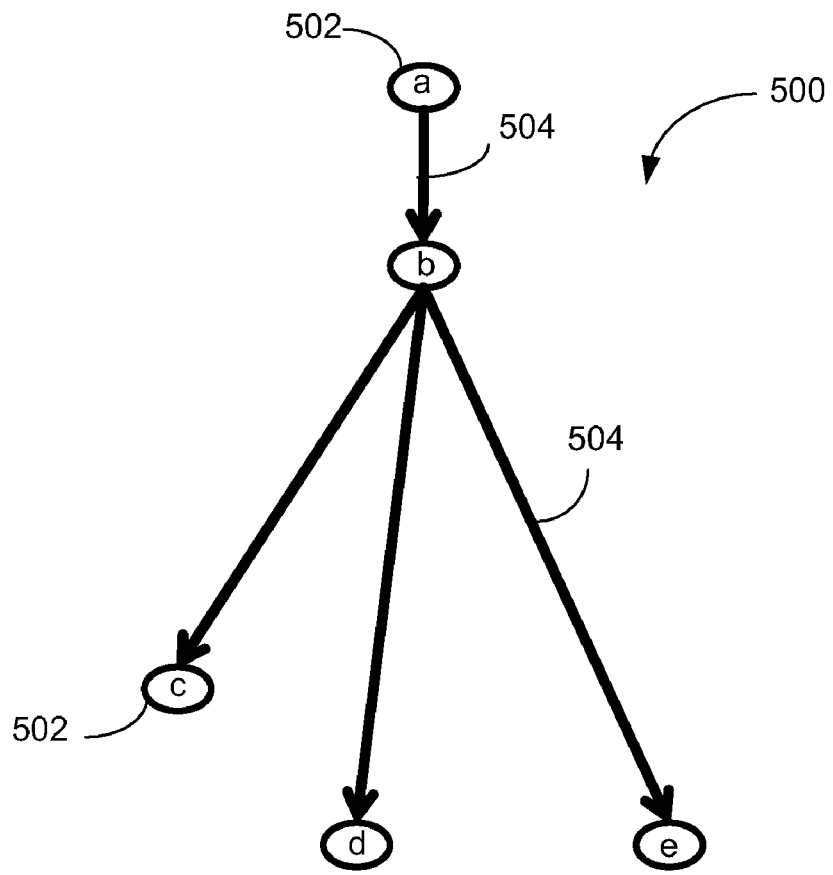
FIG. 5 is a schematic of an exemplary directed acyclic graph.

One exemplary architecture 200 (residing on a computing device 500 such as discussed later with respect to FIG. 5) in which the symbolic differentiation technique can be employed is shown in FIG. 2. In this exemplary architecture an expression for which a derivative is sought 204 is input into a derivative computation module 202. The expression 204 is then converted to a directed acyclic graph in a converter 206 which outputs a directed acyclic graph for the expression where the nodes of the directed acyclic graph represent sub-expressions of the expression. The directed acyclic graph is then converted to a derivative graph in a converter 208 via a backward differentiation module 210 or a forward differentiation module 212. In one embodiment a hash table for common sub-expressions 216 is employed so that common sub-expressions can be stored and retrieved from the hash table so that they do not have to be repeatedly recalculated. A set of derivatives are computed for the sub-expressions, which are partial derivatives of the total expression of the derivative graph 214. The set of partial derivatives are then summed in a summation module 218 to obtain a total derivative of the original input expression 220. This derivative 220 can then be employed by an application 222 that requires computation of the derivative of the expression.

1.3 Exemplary Processes Employing the Symbolic Differentiation Technique

Figure 3:
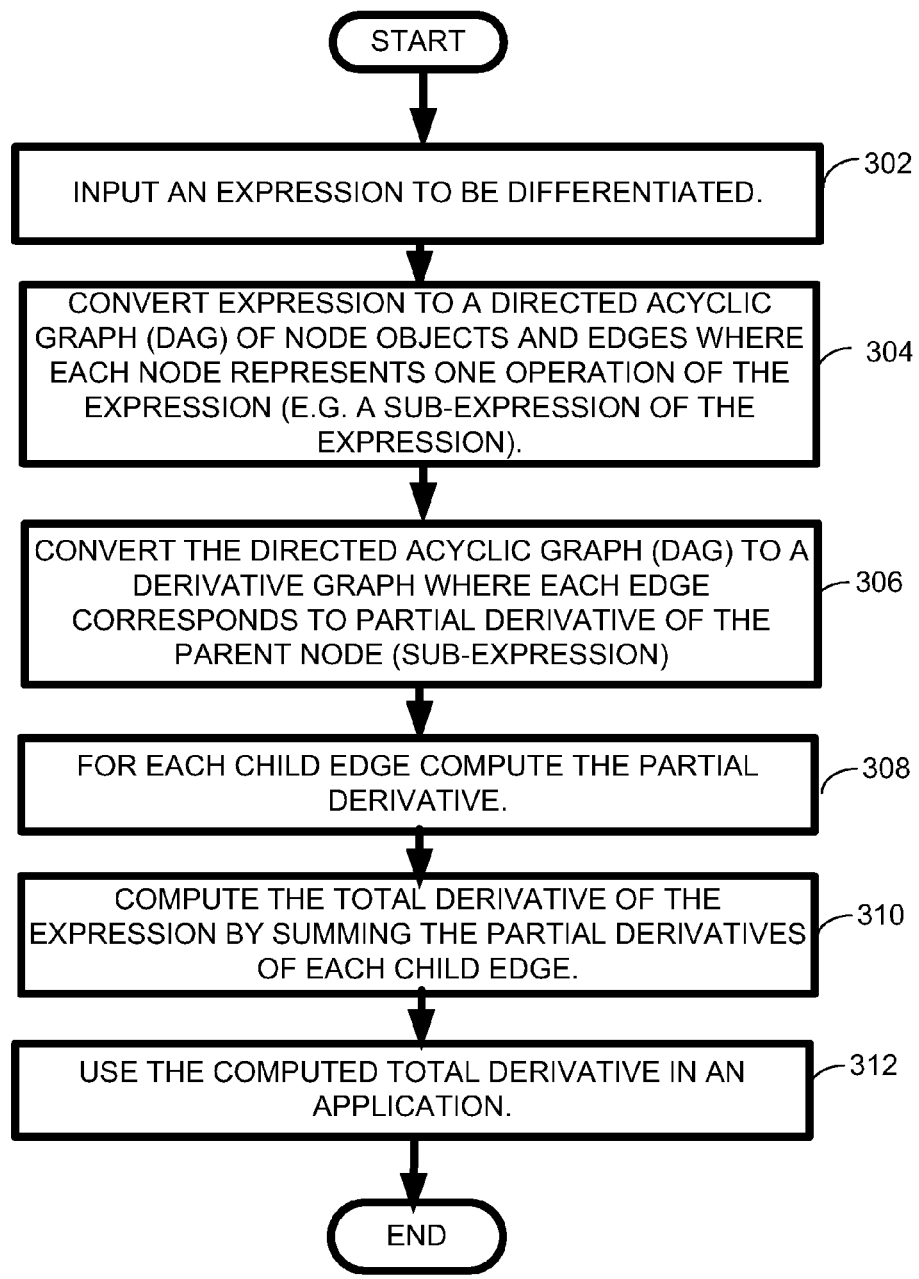
FIG. 3 is a flow diagram depicting an exemplary embodiment of a process employing one embodiment of the symbolic differentiation technique.

An exemplary process employing the symbolic differentiation technique is shown in FIG. 3. As shown in FIG. 3, an expression to be differentiated is input (box 302). The expression is converted to a directed acyclic graph of node objects and edges where each node represents one operation or sub-expression of the expression (box 304). The directed acyclic graph is then converted to a derivative graph where each edge corresponds to a partial derivative of the parent node (e.g., sub-expression of the original expression) (box 306). For each child edge of each parent node, the partial derivative of the sub-expression is computed (box 308). The total derivative of the originally input expression is then computed by summing the derivatives of each child edge (box 310). The computed total derivative of the expression is then used in an application that requires computation of the derivative for the expression (box 312).

Figure 4:
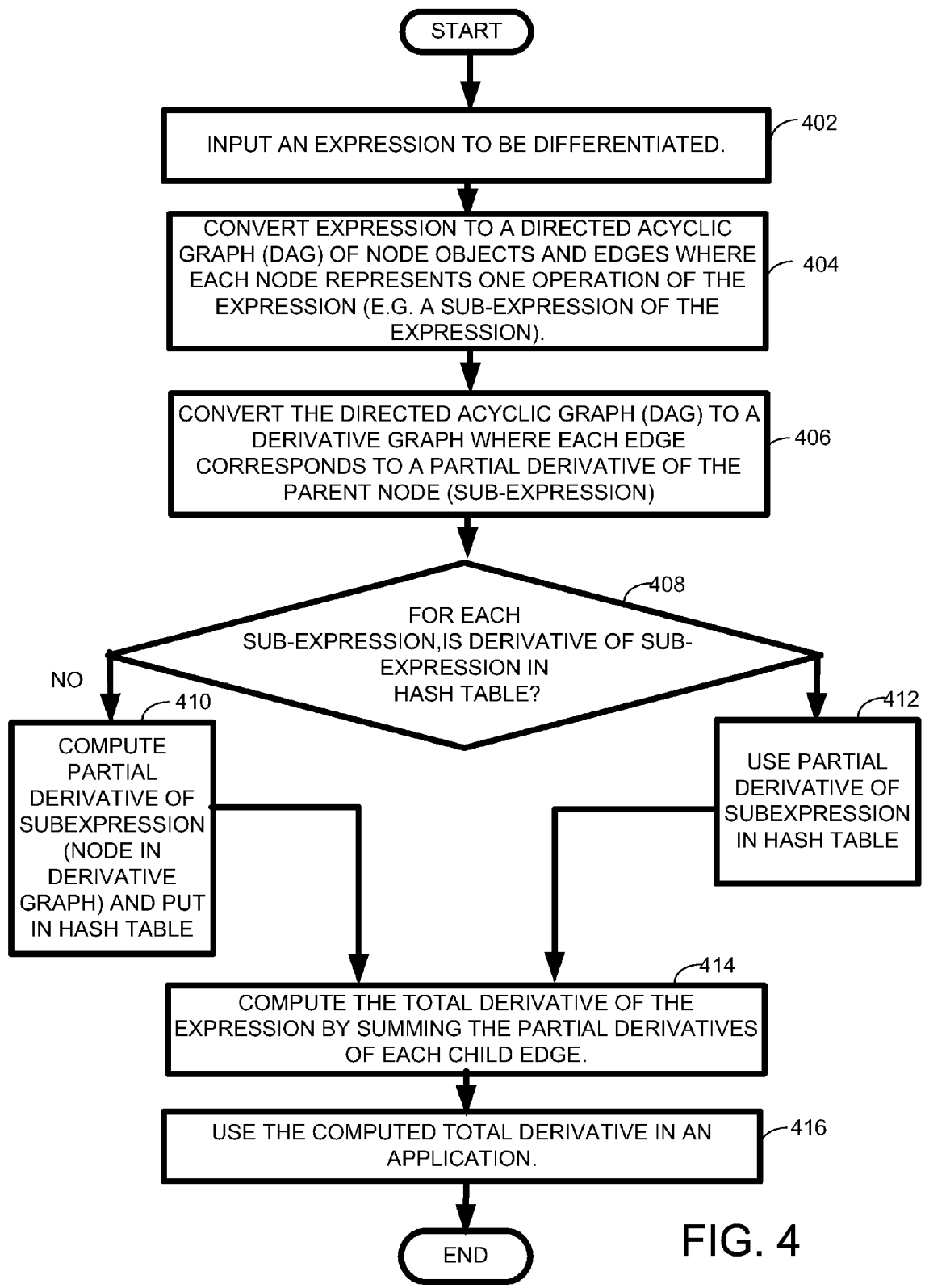
FIG. 4 is a flow diagram depicting another exemplary embodiment of a process employing one embodiment of the symbolic differentiation technique.

Another exemplary process employing the symbolic differentiation technique is shown in FIG. 4. As shown in FIG. 4, an expression to be differentiated is input (box 402). The expression is converted to a directed acyclic graph of node objects and edges where each node represents one operation or sub-expression of the expression (box 404). The directed acyclic graph is then converted to a derivative graph where each edge corresponds to a partial derivative of the parent node (e.g., sub-expression of the original expression) (box 406). For each sub-expression a check is made to see if the derivative of the sub-expression is in a hash table (box 408). If the derivative of the sub-expression is not in the hash table the derivative of the sub-expression is computed and put into the hash table (box 410). If the derivative of the sub-expression is in the hash table, this value is used for the sub-expression (box 412). In one embodiment the derivative graph is traversed starting at the root of the derivative graph and working up the graph. In another the derivative graph is traversed starting at the leaves of the derivative graph and working towards the root. The total derivative of the originally input expression is then computed by summing the derivatives of each child edge or sub-expression (box 414). The computed total derivative of the expression is then used in an application that requires computation of the derivative for the expression (box 416).

It should be noted that many alternative embodiments to the discussed embodiments are possible, and that steps and elements discussed herein may be changed, added, or eliminated, depending on the particular embodiment. These alternative embodiments include alternative steps and alternative elements that may be used, and structural changes that may be made, without departing from the scope of the disclosure.

1.4 Exemplary Embodiments and Details

Various alternate embodiments of the symbolic differentiation technique can be implemented. The following paragraphs provide some background information and details and alternate embodiments of the exemplary architecture and processes presented above.

1.4.1 Directed Acyclic Graph

A directed acyclic graph, also called a DAG, is a directed graph with no cycles; that is, for any vertex v, there is no directed path that starts and ends on v. FIG. 5 provides an example of a directed acyclic graph 500. FIG. 5 depicts graph 500 in the form of G(V,E) where the nodes or vertices, V, are {a, b, c, d, e} and the edges, E, are {(a,b), (b,c), (b,d), (b,e)}.

1.4.2 Creation of the New Derivative Graph

As discussed above, with respect to FIGS. 2, 3 and 4, the symbolic differentiation technique discussed herein employs the creation of new derivative graphs. The creation of the special structure of the graph which results from differentiating a function, the derivative graph, and how this relates to the chain rule of differentiation will now be discussed. The derivative graph has the same structure as its corresponding directed acyclic graph (e.g., expression graph) but the meaning of edges and nodes is different. In a derivative graph an edge represents the partial derivative of the parent node function with respect to the child node argument. Nodes have no operational function; they serve only to connect edges. The chain rule can thus be graphically expressed in a derivative graph—edges represent partial derivatives and nodes have no operational function.

One can use the following notation for derivatives: for $f: \mathbb{R}^1 \to \mathbb{R}^n$, $f^i_j$ is the derivative of the ith range element with respect to the jth domain element. Range and domain indices start at 0. Higher order derivatives are indicated by additional subscript indices. For example, $$f^i_{jk} = \frac{\partial^2 f_i}{\partial f_j \partial f_k}$$

Figure 6:
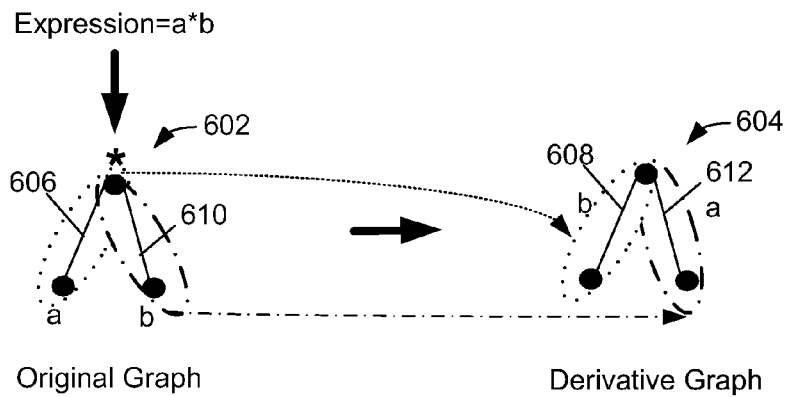
FIG. 6 is an exemplary depiction of a derivative graph for a multiplication expression. The derivative graph has the same structure as its corresponding directed acyclic graph but the meaning of the nodes is different: edges represent partial derivatives and nodes have no operation function.
Figure 7:
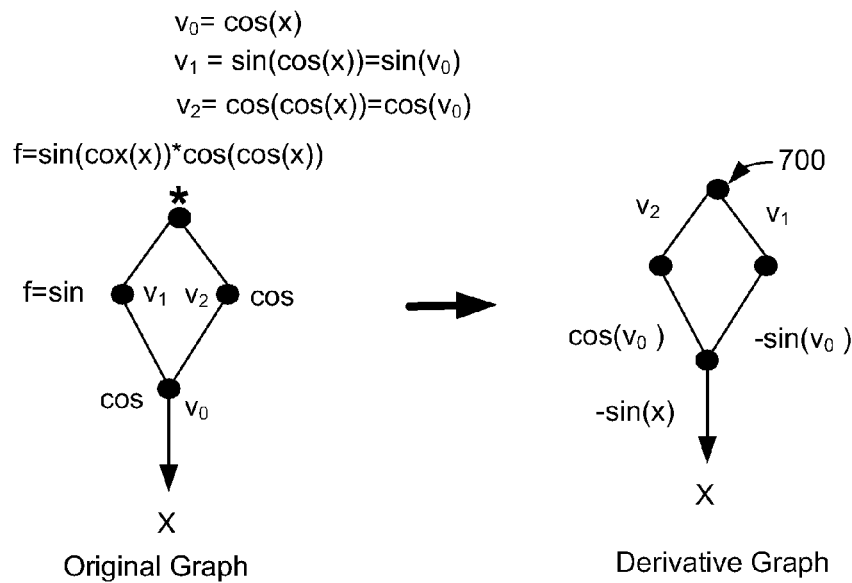
FIG. 7 is an exemplary depiction of a derivative graph for a more complicated expression.

As a simple first example, FIG. 6 shows a directed acyclic graph 602 representing the function $f=ab$ and its corresponding derivative graph 604. The edge 606 connecting the * and α symbols in the original function graph corresponds to the edge 608 representing the partial $$\frac{\partial ab}{\partial a} = b$$

in the derivative graph. Similarly, the *, b edge 610 in the original graph corresponds to the edge 612

$$\frac{\partial ab}{\partial b} = a$$

in the derivative graph. The derivative graph 700 for a more complicated function, $f=\sin(\cos(x))*\cos(\cos(x))$, is shown in FIG. 7. The nodes in the original function graph have been given labels $v_i$ to minimize clutter in the derivative graph:

$v_0=\cos(x)$ $v_1=\sin(\cos(x))=\sin(v_0)$ $v_2=\cos(\cos(x))=\cos(v_0)$

Given some $f: \mathbb{R}^1 \to \mathbb{R}^n$ one can use the derivative graph of $f_0^0$ to compute the derivative $f^i_j$ as follows. Find all paths from node i to node j. For each path compute the product of all the partial derivatives that occur along that path; $f^i_j$ is equal to the sum of these path products. In the worst case, the number of paths is exponential in the number of edges in the graph so this algorithm takes exponential time, and produces an expression whose size is exponential in the number of edges in the graph.

Figure 8:
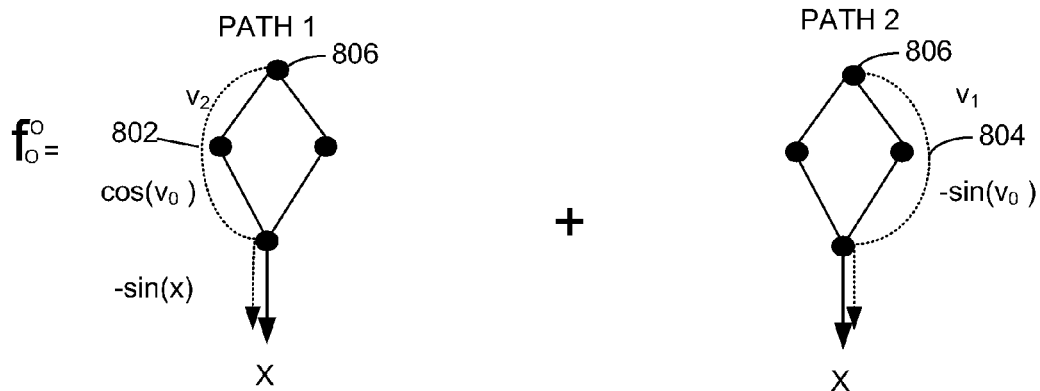
FIG. 8 shows how the sum of all of the path products equals the derivative of the example shown in FIG. 7

If one applies this differentiation procedure to the graph shown in FIG. 7 to compute $f_0^0$ one gets the result shown in FIG. 8. For each path 802, 804 from the root 806 one computes the product of all the edge terms along the path, then sums the path products:

$f_0^0 = v2 \cos(v0)(-\sin(x))+v1(-\sin(v0))(-\sin(x))=\cos(\cos(x))\cos(\cos(x))(-\sin(x))+\sin(\cos(x))(-\sin(\cos(x)))(-\sin(x))$ The sum of all path products equals the total derivative of the input expression.

1.4.3 Exemplary Implementation of One Embodiment of the Technique for Forward Differentiation If one assumes that the expression to be differentiated is represented as a directed acyclic graph of node objects each of which represents one operation in the expression then forward differentiation of $f: \mathbb{R}^1 \to \mathbb{R}^n$ is implemented by the recursive function shown in Table 1. In Table 1, the function partial(child) computes the partial derivative of each node function with respect to its child. For example if the node is the sin( ) function then partial(child)=cos(child). Upon completion deriv[i] contains $$\frac{\partial f_i}{\partial v}.$$

If a node has not previously been visited, the node is visited. If a node has been visited, the procedure advances to the next node, returns the derivative value of each child edge of the node. This continues until all nodes have been visited. The child edges of all nodes are then summed to obtain the total derivative of the input expression.

TABLE 1

Exemplary Implementation for Forward Differentiation

```
//any number of roots fi, single variable leaf v
double[ ] Forward(Node[ ] roots){ double deriv[ ] = new double[numDomainVariables];
for(int i=0; i<length(roots); i++){deriv[i] = roots[i].D( );} return deriv;
}
class Node{
```

TABLE 1-continued

Exemplary Implementation for Forward Differentiation

```
bool visited = false;
double dVal;
Node children[ ];
double D( ){ if(visited) return dVal;
visited = true;
if(this.isVariable) return dVal = 1;
if(this.isConstant) return dVal = 0;
sum = 0;
foreach child in children{sum = sum + partial(child)__child.D( );}
dVal = sum;
return sum;
}
}
```

1.4.4 Exemplary Implementation of One Embodiment of the Technique for Reverse Differentiation The reverse form, for $f: \mathbb{R}^n \to \mathbb{R}^1$ can be implemented as is shown in Table 2. In one embodiment, the variable deriv[ ] is a hash table (in this exemplary implementation the hash table maps from Variable to double values). Upon completion deriv[vj] contains the symbolic derivative $$\frac{\partial f_i}{\partial v}.$$

The embodiment in Table 2, traverses the derivative graph in a reverse manner starting from the leaves of the graph and ending at the root. It again computes the derivatives of the children of each parent node and sums these derivatives to obtain the total derivative.

TABLE 2

Exemplary Implementation for Reverse Differentiation

```
//any number of variable leaves vj, single root f
//begin with visited = 0, sum= 0, deriv[vj] = 0
Dictionary<Variable,double> Reverse(Node root){
Dictionary<Variable,double> deriv = new Dictionary<Variable,double>;
f.D(deriv, 1);
return deriv;
}
class Node{ int visited, numParentNodes;
double sum;
Node children[ ];
D(Dictionary<Node,double> deriv, double cumDeriv){
visited += 1;
sum = sum + cumDeriv;
if(visited >= numParentNodes){
foreach(child in children){child.D(deriv, sum__partial(child));}
if(this.isVariable){deriv[this] = sum;}
}
}
```

To use the forward method on $f: \mathbb{R}^1 \to \mathbb{R}^n$ apply the function Forward to the n $\mathbb{R}^1 \to \mathbb{R}^n$ function sub-graphs. To use the reverse method apply the function Reverse to the m $\mathbb{R}^n \to \mathbb{R}^1$ function sub-graphs.

1.4.5 Common Sub-Expression Elimination Via Global Hash Table

As discussed, the paragraph above, common sub-expression elimination can easily be incorporated by using a global hash table. Before an expression is instantiated as a node in the derivative graph its hash code is used to see if it already exists in this table. If it does the existing value is used otherwise a new expression is created and added to the table.

1.4.6 Algebraic Simplification by Creating Special Constructors

Algebraic simplification can be incorporated easily by creating special constructors for each operator. For example, Table 3 below gives the constructor for the * operator, that performs the following symbolic algebraic simplifications:

$$a*1 \to a \quad a*-1 \to -a$$

$$a*0 \to 0 \quad c_0*c_1 \to Constant(c_0*c_1)$$

where a is a variable argument to the * operator, $c_0$, $c_1$ are constant arguments to the * operator, and Constant( ) is the constructor for the Constant class which creates a new node that has a constant value.

Similar algebraic simplification rules can be incorporated in the constructors for other arithmetic and functional operations. This is much less powerful then the algebraic simplification performed by some computer programs but powerful enough for these important common cases:

$$a*1 \to a \quad a*-1 \to -a$$

$$a*0 \to 0 \quad a \pm 0 \to a$$

$$a/a \to 1 \quad a/-1 \to -a$$

$$a-a \to 0 \quad f(c_0) \to Constant(f(c_0))$$

$$c_0*c_1 \to Constant(c_0*c_1) \quad c_0 \pm c1 \to Constant(c_0 \pm c_1)$$

$$c_0/c_1 \to Constant(c_0/c_1)$$

TABLE 3

Exemplary Implementation of Algebraic Simplification

```
public static Function operator *(Function a,Function b) {
Function alreadyExists = commutativeOperators(typeof(Times),a,b);
if (alreadyExists != null) { return alreadyExists; }
//do various simple constant optimizations
Constant ca = a as Constant,cb = b as Constant;
if (ca != null && cb != null) { return ca __ cb; } //will use
Constant __ operator
overloading
    if (ca != null) {
    if (ca.leafValue == 0) { return 0; }
    if (ca.leafValue == 1) { return b; }
    if (ca.leafValue == -1) { return -b; }
    if (ca.leafValue < 0) { return -(b __ (-ca.leafValue)); }
    return (new Times( )).compose(b,a);
}
if (cb != null) {
    if (cb.leafValue == 0) { return 0; }
    if (cb.leafValue == 1) { return a; }
    if (cb.leafValue == -1) { return -a; }
    if (cb.leafValue < 0) { return -(a __ (-cb.leafValue)); }
    return (new Times( )).compose(a,b);
}
return (new Times( )).compose(a,b);
}
}
```

The combination of common sub-expression elimination via hash table and algebraic simplification can significantly reduce the number of operations in a derivative graph. The directed acyclic graph contained in deriv[i] for the forward form, and in deriv[vj] for the reverse form, is a purely symbolic representation of the derivative expression and can be used as an argument to any further desired functions in new directed acyclic graphs. Higher order derivatives can trivially be computed by applying the D( ) function to these derivative expression graphs.

The derivative graph can easily be translated, using well known code generation techniques, to a program in an arbitrary programming language such as C# or C++. This program can then be compiled to generate an efficient executable which avoids all of the interpretive overhead normally present in automatic differentiation.

2.0 The Computing Environment

The symbolic differentiation technique is designed to operate in a computing environment. The following description is intended to provide a brief, general description of a suitable computing environment in which the symbolic differentiation technique can be implemented. The technique is operational with numerous general purpose or special purpose computing system environments or configurations. Examples of well known computing systems, environments, and/or configurations that may be suitable include, but are not limited to, personal computers, server computers, hand-held or laptop devices (for example, media players, notebook computers, cellular phones, personal data assistants, voice recorders), multiprocessor systems, microprocessor-based systems, set top boxes, programmable consumer electronics, network PCs, minicomputers, mainframe computers, distributed computing environments that include any of the above systems or devices, and the like.

Figure 9:
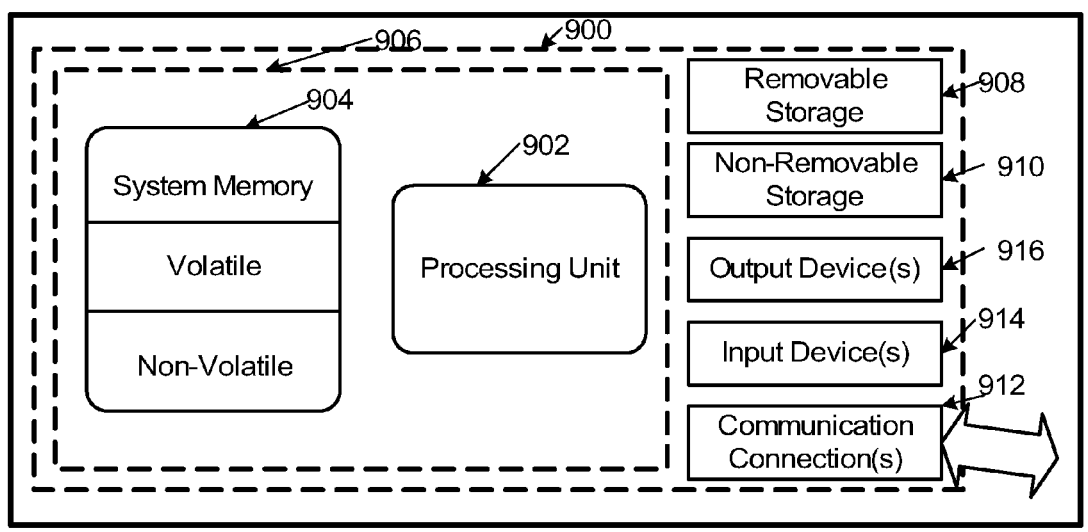
FIG. 9 is a schematic of an exemplary computing device in which the symbolic differentiation technique can be practiced.

FIG. 9 illustrates an example of a suitable computing system environment. The computing system environment is only one example of a suitable computing environment and is not intended to suggest any limitation as to the scope of use or functionality of the present technique. Neither should the computing environment be interpreted as having any dependency or requirement relating to any one or combination of components illustrated in the exemplary operating environment. With reference to FIG. 9, an exemplary system for implementing the symbolic differentiation technique includes a computing device, such as computing device 900. In its most basic configuration, computing device 900 typically includes at least one processing unit 902 and memory 904. Depending on the exact configuration and type of computing device, memory 904 may be volatile (such as RAM), non-volatile (such as ROM, flash memory, etc.) or some combination of the two. This most basic configuration is illustrated in FIG. 9 by dashed line 906. Additionally, device 900 may also have additional features/functionality. For example, device 900 may also include additional storage (removable and/or non-removable) including, but not limited to, magnetic or optical disks or tape. Such additional storage is illustrated in FIG. 9 by removable storage 908 and non-removable storage 910. Computer storage media includes volatile and nonvolatile, removable and non-removable media implemented in any method or technology for storage of information such as computer readable instructions, data structures, program modules or other data. Memory 904, removable storage 908 and non-removable storage 910 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 900. Any such computer storage media may be part of device 900.

Device 900 may also contain communications connection(s) 912 that allow the device to communicate with other devices. Communications connection(s) 912 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, RF, infrared and other wireless media. The term computer readable media as used herein includes both storage media and communication media.

Device 900 may have various input device(s) 914 such as a display, a keyboard, mouse, pen, camera, touch input device, and so on. Output device(s) 916 such as speakers, a printer, and so on may also be included. All of these devices are well known in the art and need not be discussed at length here.

The symbolic differentiation technique may be described in the general context of computer-executable instructions, such as program modules, being executed by a computing device. Generally, program modules include routines, programs, objects, components, data structures, and so on, that perform particular tasks or implement particular abstract data types. The symbolic differentiation technique may be practiced in distributed computing environments where tasks are performed by remote processing devices that are linked through a communications network. In a distributed computing environment, program modules may be located in both local and remote computer storage media including memory storage devices.

It should also be noted that any or all of the aforementioned alternate embodiments described herein may be used in any combination desired to form additional hybrid embodiments. Although the subject matter has been described in language specific to structural features and/or methodological acts, it is to be understood that the subject matter defined in the appended claims is not necessarily limited to the specific features or acts described above. The specific features and acts described above are disclosed as example forms of implementing the claims.

Wherefore, what is claimed is:

1. A process performed by a computing device for computing the symbolic derivative of an expression to be used in an application, the process comprising:
   inputting an expression to be differentiated;
   converting the expression to a directed acyclic graph of node objects and edges where each node represents one operation or sub-expression of the expression;
   converting the directed acyclic graph to a derivative graph where each edge of the derivative graph corresponds to a partial derivative of the parent node which is a sub-expression of the original expression;
   for each child for each parent node, computing the partial derivative of the sub-expression;
   computing the total derivative of the input expression by summing the partial derivatives of each child edge; and
   using the computed total derivative of the expression is in an application that requires computation of the derivative for the expression.

2. The computer-implemented process of claim 1 further comprising using backward differentiation when computing the set of partial derivatives for each of the sub-expressions of the derivative graph.

3. The computer-implemented process of claim 1 further comprising using forward differentiation when computing the set of partial derivatives for each of the sub-expressions of the derivative graph.

4. The computer-implemented process of claim 3 further comprising using a hash table for common sub-expressions so common sub-expressions can be stored and retrieved from the hash table instead of having to be repeatedly recomputed.

5. The computer-implemented process of claim 1 further comprising using algebraic simplification rules by creating special constructors for operators employed in creating the derivative graph.

6. The computer-implemented process of claim 1 further comprising using both a hash table to store common expressions and special constructors to more efficiently compute the derivative for the input expression.

7. A process performed by a computing device for computing the derivative of an expression to be used in an application, the process comprising:
inputting an expression to be differentiated;
converting the expression to a directed acyclic graph of node objects and edges where each node represents one operation or sub-expression of the expression;
converting the directed acyclic graph to a derivative graph where each edge of the derivative graph corresponds to a partial derivative of the parent node;
for each sub-expression, making a check to see if the derivative of the sub-expression is in a hash table;
if the derivative of the sub-expression is not in the hash table, computing the derivative of the sub-expression and putting the derivative of the sub-expression into the hash table;
if the derivative of the sub-expression is in the hash table, using the value in the hash table as the value for the sub-expression;
computing the total derivative of the input expression by summing the derivatives of each child edge; and
using the computed total derivative of the expression is in an application that requires computation of the derivative for the expression.

8. The computer-implemented process of claim 7 further comprising converting the derivative graph to a programming language.

9. The computer-implemented process of claim 7 further comprising traversing the derivative graph from top to bottom.

10. The computer-implemented process of claim 7 further comprising traversing the derivative graph from bottom to top.

11. The computer-implemented process of claim 7 wherein the application that requires computation of the derivative for the expression relates to computing an optimization of a smooth continuous function in wherein the gradient of the objective function to be minimized or maximized is computed.

12. The computer-implemented process of claim 7 wherein the application that requires computation of the derivative for the expression relates to sensitivity analysis wherein the input variables to a function that have the greatest effect on the output are computed.

13. The computer-implemented process of claim 7 wherein the application that requires computation of the derivative for the expression relates to error analysis, wherein bounds on an error in computing a function given that there are errors of known sizes in the inputs are computed.

14. A system for computing the derivative of an expression, comprising:
a general purpose computing device;
a computer program comprising program modules executable by the general purpose computing device, wherein the computing device is directed by the program modules of the computer program to,
input an expression for which a derivative is sought;
convert the expression to a directed acyclic graph where the nodes of the graph represent sub-expressions of the expression;
convert the directed acyclic graph into a derivative graph;
compute a set of partial derivatives for each of the sub-expressions of the derivative graph;
sum the set of partial derivatives for the sub-expressions to obtain a total derivative of the original input expression; and
employ the total derivative of the original input expression in an application that requires computation of the derivative of the expression.

15. The system of claim 14 further comprising a module for using backward differentiation when computing the set of partial derivatives for each of the sub-expressions of the derivative graph.

16. The system of claim 14 further comprising a module for using forward differentiation when computing the set of partial derivatives for each of the sub-expressions of the derivative graph.

17. The system of claim 14 further comprising a module for using a hash table for common sub-expressions so common sub-expressions can be stored and retrieved from the hash table vice being repeatedly recomputed.

18. The system of claim 14 further comprising a module for using operator overloading when computing operators.

19. The system of claim 14 wherein summing the set of partial derivatives further comprises summing all edges of all nodes in the derivative graph.

20. The system of claim 14 further comprising a module for converting the derivative graph to a C source programming language.

* * * * *